Sept. 5, 1967 — H. G. DALEY — 3,339,206
POST-OPERATIVE EYEGLASS
Filed Dec. 4, 1964
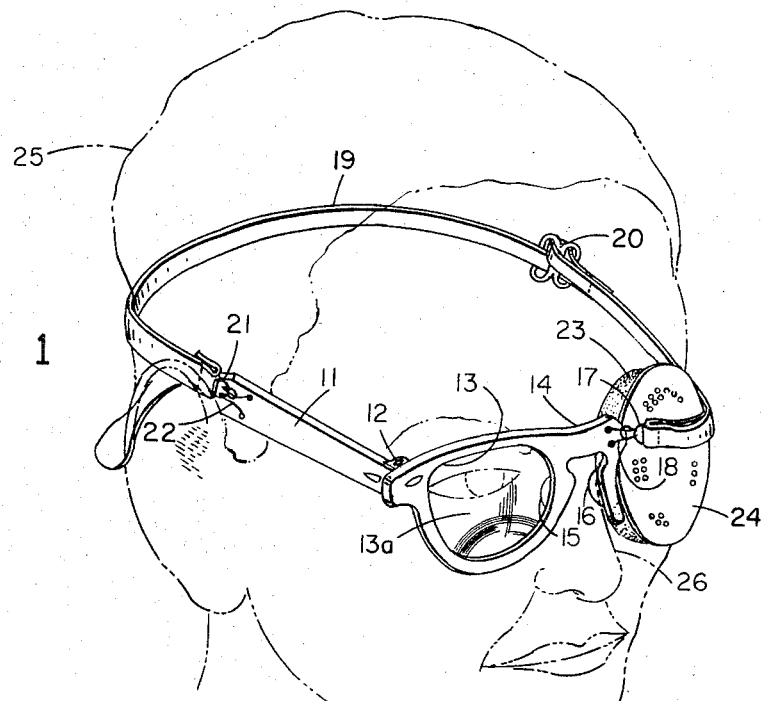
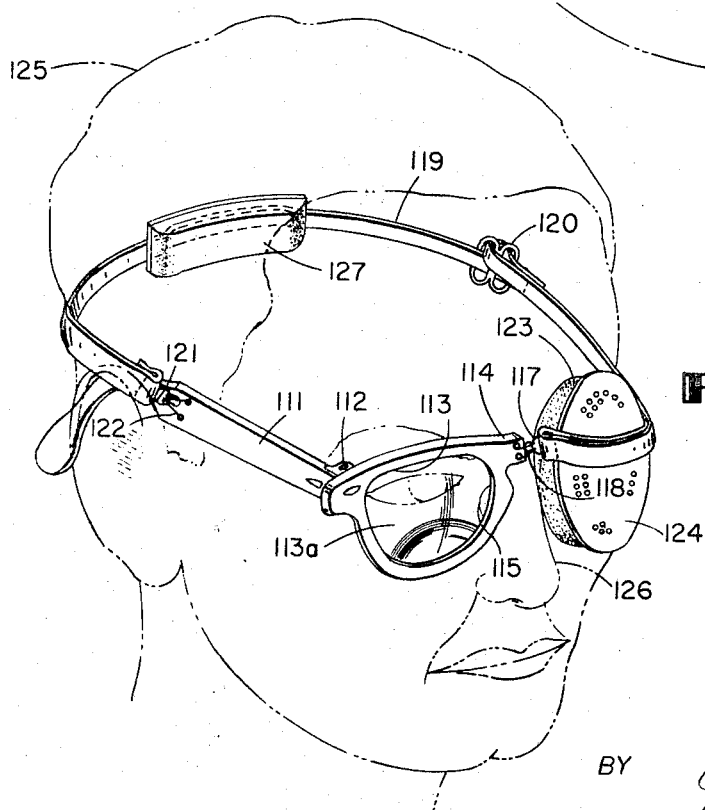
INVENTOR.
HENRY G. DALEY
BY
ATTORNEY.

United States Patent Office 3,339,206
Patented Sept. 5, 1967

3,339,206
POST-OPERATIVE EYEGLASS
Henry G. Daley, 14 Rhodes Ave.,
Lynn, Mass. 01904
Filed Dec. 4, 1964, Ser. No. 415,879
4 Claims. (Cl. 2—2)

This invention relates to a post-operative eyeglass. In particular, it relates to an eyeglass which permits a person who has had surgery on one eye to be able to use the lens for his other eye during the recovery period.

Eye surgery, such a cataract removal, usually requires that the affected eye be covered with a suitable protective pad during the recovery period which can often times last several weeks or more. The nature and thickness of the eye pad varies in accordance with the operative procedures used and the post-operative treatment required. In most cases, the eye pads used are so large or bulky that a patient who attempts to use his regular eyeglass so as to facilitite use of this other eye, finds it almost impossible to obtain any stable position.

Various attempts have been made in the past to overcome this problem of providing the patient with an eyeglass which can be easily installed or removed and which will provide the proper location in a stable form for the required lens. However, none hitherto reported have been successful. It is one object of this invention to provide such a device.

Other objects and advantages of this invention will be apparent from the specification and claims which follow and from the appended drawings wherein:

FIG. 1 is a perspective view of one embodiment of this invention shown as applied to a phantom head.

FIG. 2 is a perspective view of another embodiment of this invention in similar position as in FIG. 1.

The invention comprises generally an eyeglass frame having a temple connected by a hinge to a single lens chassis. On the other side of the chassis extends a nose bridge portion and a nose pad portion. A headband extends from the nose bridge portion over the eye pad covering the surgical eye and around the head to the temple. In its most stable form, the invention has a complete nose bridge and a second nose pad for the other side. The headband should be adjustable and is preferably made of resilient material such as elasticized fabric. For maximum comfort, a soft or spongy pad is provided in conjunction with the headband for the back of the head. The single lens chassis is of a sufficiently conventional design so that an optician can remove the lens from the normal spectacles of the patient and readily insert it in the lens chassis of this invention. With this invention the patient has no problem with the size or bulkiness of the eye pad and is able to achieve stability, together with easy installation and removal.

The embodiment illustrated in FIG. 1 comprises a temple 11, a hinge 12 connecting the temple to one side of a lens chassis 13 provided with the normal lens 13a of the patient. On the other side of the lens chassis is a full nose bridge 14 having nose pads 15 and 16 for seating on nose 26. At the free edge of the bridge 14 is a hook 18 to which is attached an eye 17 of a resilient band 19 having an adjustable loop 20 and which extends over the metal pad cover 24 protecting the eye pad 23, and encircles the head member 25, terminating in an eye 21 attached to a hook 22 located at an intermediate position on the temple 11.

The embodiment illustrated in FIG. 2 comprises a temple 111 attached by a hinge 112 to a lens chassis 113 equipped with the normal lens 113a of the patient. On the other side of the chassis 113 a nose bridge portion 114 extends over the ridge of the nose 126 and has a single nose pad 115. The resilient headband 119 is attached by its eye 117 to a hook 118 on bridge 114, extends over the metal pad cover 124 protecting cloth pad 123, passes through a sponge pad 127 at the back of the head 125, and terminates in an eye 121 connected to a hook 122 mounted on an intermediate portion of the temple 111.

While several embodiments of this invention have been described in detail, the invention is not limited to the particular construction set forth, since various changes in the form, proportions and arrangement of parts and in the details of construction may be resorted to without departing from the spirit and scope of the invention or destroying any of the advantages contained in the same, as heretofore described and as defined below in the following claims.

I claim:

1. A post-operative eyeglass frame comprising a temple portion, a single lens chassis having a lens therein, hinge means connecting said temple portion to one side of said chassis, a nose bridge portion extending from the other side of said chassis, a nose pad portion depending from said chassis, a headband extending from said nose bridge portion to said temple portion, and an eye pad adapted to be releasably retained by said strap against a wearer's eye adjacent said nose bridge portion.

2. A post-operative eyeglass frame comprising a temple portion, a single lens chassis having a lens therein, hinge means connecting said temple portion to one side of said chassis, a full nose bridge portion extending from the other side of said chassis and provided with spaced depending nose pads, a headband extending from said nose bridge portion to said temple portion, and an eye pad adapted to be releasably retained by said strap against a wearer's eye adjacent said nose bridge portion.

3. The eyeglass frame of claim 1 wherein said headband is resilient.

4. A post-operative viewing and protecting means comprising an eyeglass frame and an eye pad; said eyeglass frame comprising a temple portion, a single lens chassis having a lens therein, hinge means connecting said temple portion to one side of said chassis, a nose bridge portion extending from the other side of said chassis, a nose pad portion extending from said chassis, a headband extending from said nose bridge portion to said temple portion, said eye pad releasably retained by said headband adjacent said nose bridge portion when said eye pad covers one eye of the user and means releasably securing said headband to said temple and nose bridge portions.

References Cited

UNITED STATES PATENTS

| 1,607,717 | 11/1926 | Nagler et al. | 128—163 |
| 2,023,523 | 12/1935 | Grimball | 351—156 X |
| 2,172,573 | 9/1939 | Blumenthal | 128—163 |
| 2,643,382 | 6/1953 | McLeod | 2—15 |
| 2,819,650 | 1/1958 | Seron | 351—156 |
| 3,167,619 | 1/1965 | Palmaer | 2—209 X |

FOREIGN PATENTS

| 1,266,652 | 6/1961 | France. |

JORDAN FRANKLIN, Primary Examiner.

G. H. KRIZMANICH, Examiner.